US 12,140,239 B2

(12) United States Patent
Hall et al.

(10) Patent No.: US 12,140,239 B2
(45) Date of Patent: Nov. 12, 2024

(54) FLUID FLOW DEVICE

(71) Applicant: OFIP LIMITED, Oxford (GB)

(72) Inventors: Benjamin Hall, Oxford (GB); Matthew Collins, Oxford (GB); Thomas Povey, Oxford (GB)

(73) Assignee: OFIP LIMITED, Oxford (GB)

( * ) Notice: Subject to any disclaimer, the term of this patent is extended or adjusted under 35 U.S.C. 154(b) by 0 days.

(21) Appl. No.: 16/645,700

(22) PCT Filed: Sep. 18, 2018

(86) PCT No.: PCT/GB2018/052663
§ 371 (c)(1),
(2) Date: Mar. 9, 2020

(87) PCT Pub. No.: WO2019/058110
PCT Pub. Date: Mar. 28, 2019

(65) Prior Publication Data
US 2020/0370669 A1    Nov. 26, 2020

(30) Foreign Application Priority Data

Sep. 19, 2017 (GB) ..................................... 1715092

(51) Int. Cl.
*F16K 25/00* (2006.01)
*F16K 15/02* (2006.01)

(52) U.S. Cl.
CPC .......... *F16K 25/005* (2013.01); *F16K 15/026* (2013.01)

(58) Field of Classification Search
CPC .... F16K 25/005; F16K 15/026; F16K 15/021; F16K 15/063; F16K 15/06
See application file for complete search history.

(56) References Cited

U.S. PATENT DOCUMENTS 2,060,748 A * 11/1936 Roberts ................. F16K 15/025
251/332
2,673,062 A *  3/1954 Cornelius ............. F16K 15/026
137/540

(Continued)

FOREIGN PATENT DOCUMENTS

CN    102141157 A    8/2011
CN    203847732 U    9/2014

(Continued)

OTHER PUBLICATIONS

Search Report under Section 17(5) in United Kingdom Patent Application No. GB1715092.1 dated Mar. 8, 2018, 5 pages.

(Continued)

*Primary Examiner* — Reinaldo Sanchez-Medina
*Assistant Examiner* — Nicole Gardner
(74) *Attorney, Agent, or Firm* — Withrow + Terranova, PLLC; Vincent K. Gustafson

(57) ABSTRACT

A device for controlling the flow of a fluid through a conduit from an upstream side of the device to a downstream side of the device. The device includes a housing defining a valve aperture and a mounting member arranged on the downstream side of the valve aperture. A valve member is movably mounted on the mounting member and is arranged to selectively open and close the valve aperture to control the flow of fluid. A soft seal is arranged on the housing for substantially sealing the valve aperture when the valve member contacts the housing. The soft seal is located downstream of a convex curved surface of the housing which is shaped to separate the flow of fluid through the valve aperture away from the surface of the housing such that the fluid does not impinge directly on the soft seal.

13 Claims, 5 Drawing Sheets

(56) References Cited

U.S. PATENT DOCUMENTS

Figure 1:
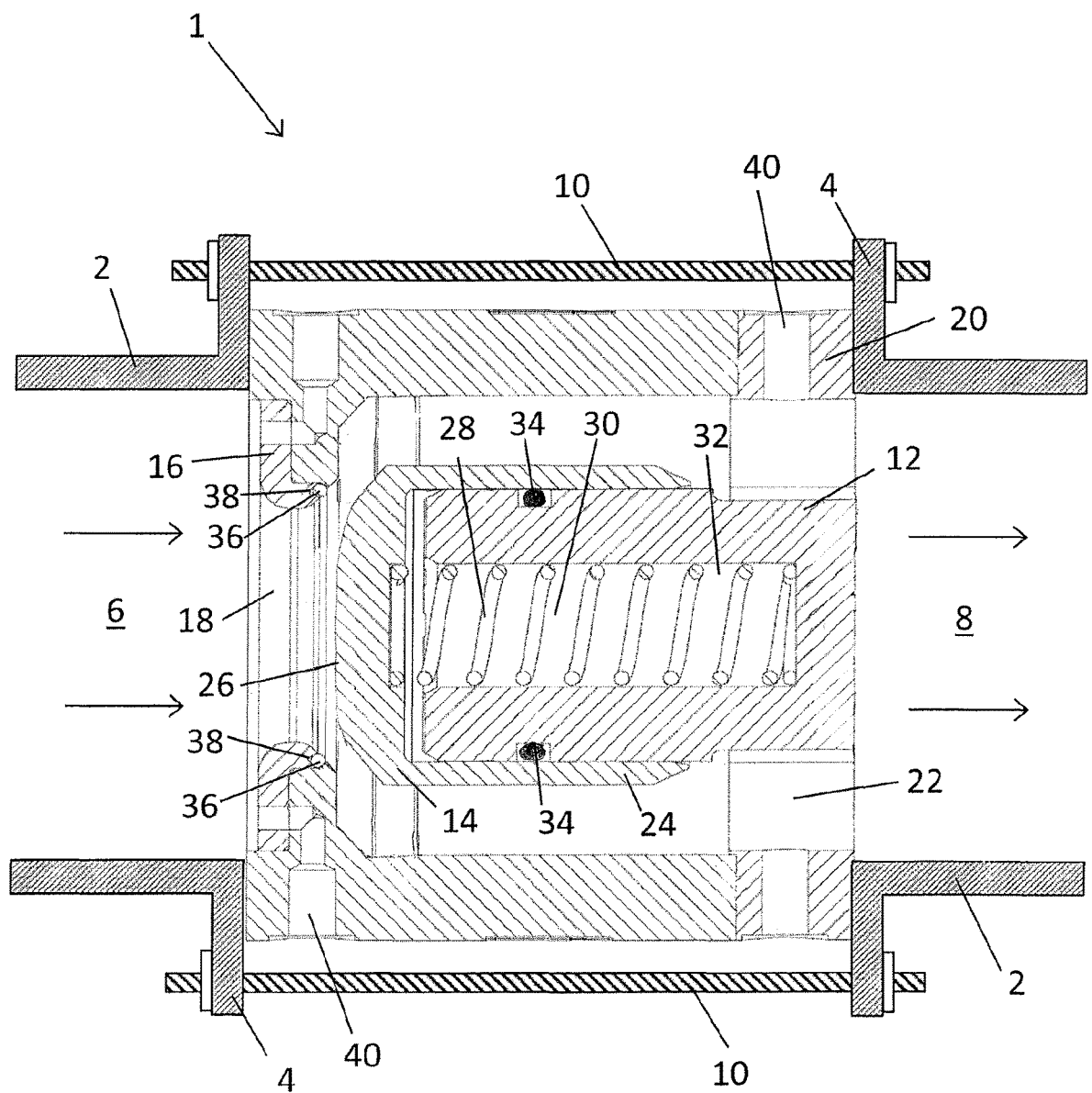

| | | | | |
|---|---|---|---|---|
| 3,318,577 | A * | 5/1967 | Banks | F16K 39/024 |
| | | | | 251/332 |
| 3,327,991 | A | 6/1967 | Wallace | |
| 3,378,030 | A * | 4/1968 | Cary | F16K 15/026 |
| | | | | 137/516.29 |
| 3,515,371 | A | 6/1970 | King et al. | |
| 3,960,364 | A | 6/1976 | Hargrave | |
| 3,995,658 | A * | 12/1976 | Hager | F16K 15/026 |
| | | | | 137/543 |
| 4,213,021 | A | 7/1980 | Alexander | |
| 4,337,788 | A | 7/1982 | Seger | |
| 4,354,520 | A * | 10/1982 | Easley, Jr. | A62B 18/10 |
| | | | | 128/205.24 |
| 4,638,833 | A | 1/1987 | Wolcott, II | |
| 4,669,702 | A | 6/1987 | Tripp | |
| 4,693,270 | A * | 9/1987 | Yaindl | F16K 47/00 |
| | | | | 137/513.3 |
| 4,911,196 | A * | 3/1990 | Kemp | F16K 15/026 |
| | | | | 137/220 |
| 5,188,150 | A * | 2/1993 | Esplin | F16K 1/42 |
| | | | | 137/630.14 |
| 5,469,884 | A * | 11/1995 | Madrid | F16K 15/026 |
| | | | | 137/515.7 |
| 5,618,025 | A | 4/1997 | Barron et al. | |
| 6,095,186 | A | 8/2000 | Nagel | |
| 11,460,870 | B2 * | 10/2022 | Povey | F16K 1/126 |
| 2011/0226980 | A1 | 9/2011 | Richardson et al. | |
| 2015/0075649 | A1 | 3/2015 | Povey | |
| 2016/0333663 | A1 | 11/2016 | Volent | |
| 2018/0038491 | A1 * | 2/2018 | Gaburri | F16K 5/207 |
| 2019/0011055 | A1 | 1/2019 | Li et al. | |

FOREIGN PATENT DOCUMENTS

| | | |
|---|---|---|
| CN | 204226669 U | 3/2015 |
| CN | 106090419 A | 11/2016 |
| EP | 0578914 A1 | 1/1994 |
| WO | 2017187155 A1 | 11/2017 |

OTHER PUBLICATIONS

Notification of Transmittal of the International Search Report and the Written Opinion (Form PCT/ISA/220), International Search Report (Form PCT/ISA/210), and Written Opinion (Form PCT/ISA/237) for International Application No. PCT/GB2018/052663 mailed Nov. 22, 2018 (11 pages).

First Office Action for Chinese Patent Application No. 201880056756.4, mailed Aug. 3, 2021, 24 pages.

Second Office Action for Chinese Patent Application No. 201880056756.4, mailed Feb. 22, 2022, 19 pages.

Examination Report for European Patent Application No. 18778973.0, mailed Jul. 11, 2022, 6 pages.

Examination Report for European Patent Application No. 18778973.0, mailed May 24, 2024, 5 pages.

* cited by examiner

FLUID FLOW DEVICE

This application is a 35 U.S.C. § 371 national phase filing of International Application No. PCT/GB2018/052663 filed on Sep. 18, 2018, and further claims priority to United Kingdom Patent Application No. 1715092.1 filed on Sep. 19, 2017, wherein the disclosures of the foregoing applications are hereby incorporated by reference herein in their respective entireties.

This invention relates to a device for controlling the flow of fluid therethrough, in particular to a device including a valve member for opening and closing a valve aperture to control the flow of fluid through the device.

In fluid flow systems such as pipes and conduits, e.g. as can be found in many different industrial situations, there is a need to regulate the pressure in a fluid flow stream. In such systems there is an input pressure that may be constant or fluctuating in time and which it is desired to control to a lower target output pressure, which also can be constant or fluctuating.

The pressure in such systems may be regulated using a pressure regulator, e.g. as disclosed in the Applicant's previous application WO 2013/068747 A1 which is arranged to control the downstream pressure in a conduit. The flow through the pressure regulator is selectively controlled by a valve member that opens and closes a plurality of valve apertures, e.g. dependent upon one or more of the pressure in the downstream side of the conduit, the upstream side of the conduit and a control pressure that is arranged to act on the valve member.

In such pressure regulators a seal between the valve member and the housing of the pressure regulator to help to minimise the leakage of fluid through the valve apertures when the valve apertures are fully closed by the valve member, i.e. at "shut-off".

It is an object of the invention to provide a device for controlling the flow of a fluid through a conduit with an improved shut-off.

When viewed from a first aspect the invention provides a device for controlling the flow of a fluid through a conduit from an upstream side of the device to a downstream side of the device, the device comprising:
  a housing defining a valve aperture;
  a mounting member arranged on the downstream side of the valve aperture;
  a valve member movably mounted on the mounting member, wherein the valve member is arranged to move reciprocally to selectively open and close the valve aperture, thereby controlling flow of the fluid through the valve aperture; and
  a soft seal arranged on the housing for substantially sealing the valve aperture when the valve member contacts the housing, wherein the soft seal is located downstream of a convex curved surface of the housing, and wherein the convex curved surface is shaped to separate the flow of fluid through the valve aperture away from the surface of the housing such that the fluid does not impinge directly on the soft seal.

The present invention provides a device for controlling (e.g. pressure regulating) the flow of fluid through a conduit (e.g. in which the device is placed). The flow of fluid through the device is controlled between an upstream side of the device and a downstream side of the device, with a valve aperture of the device, for example, defining the boundary between the upstream and downstream sides. The flow of fluid through the valve aperture, and thus through the device from the upstream side to the downstream side, is controlled by a valve member that is movably mounted on a mounting member. The mounting member is arranged in the device downstream of the valve aperture (and thus preferably the valve member is arranged downstream of the valve aperture) and the valve member is arranged to move reciprocally on the mounting member to selectively open and close the valve aperture so that the flow of fluid through the valve aperture may be controlled.

A soft seal is provided downstream of a convex curved surface of the housing of the device that defines the valve aperture. The soft seal is arranged, and acts, to substantially seal the valve aperture when the valve member contacts the housing (and thus also contacts the soft seal on the housing). The convex curved surface of the housing is shaped such that when the valve member is positioned such that the valve aperture is at least partially open and thus fluid flows through the valve aperture (and thus past the convex curved surface of the housing), the shape of the convex curved surface causes the flow of fluid through the valve aperture to separate from the convex curved surface and thus away from the surface of the housing. Owing to the soft seal being positioned downstream of the convex curved surface, this separation of the fluid flow from the convex curved surface means that that the flow of fluid does not impinge on the soft seal directly.

Thus it will be appreciated that by locating the soft seal on the housing downstream of the convex curved surface such that the fluid flow is separated from the surface, the soft seal lies out of, and is shielded from, the fluid flow. This helps to reduce wear of the soft seal by the fluid flow, particularly when the fluid flow contains abrasive particles entrained in the fluid. Reducing wear of the soft seal (which may be prone to erosion) helps to improve the reliability and durability of the fluid flow control device.

Furthermore, reducing the wear of the soft seal by separating the fluid flow from the surface on which the soft seal is provided helps to enable, at least in preferred embodiments, the soft seal to be exposed and thus contacted directly by the valve member, without having to otherwise protect the soft seal (e.g. with a hard cover). This helps to improve the performance of the seal (e.g. at shut-off) between the valve member and the housing, owing to the beneficial material properties (e.g. elasticity, deformability) that the soft seal may possess. Thus the material for the soft seal may be chosen primarily based on its sealing properties, rather than its durability.

The fluid flow control device of the present invention may be any suitable and desired such device that is configured to control the flow of fluid therethrough. In a preferred embodiment the device comprises a pressure reducing valve. Thus preferably the device is arranged to control the flow of fluid through the valve aperture to induce a pressure drop in the fluid, e.g. from the upstream side to the downstream side of the device.

The device and the components thereof may be arranged in any suitable and desired way. In a preferred embodiment the mounting member, the valve member and the valve aperture (and also preferably the device itself) are arranged coaxially with respect to each other about an axis. In a preferred embodiment the mounting member, the valve member and the valve aperture (and also preferably the device itself) are substantially rotationally symmetric about the axis. Preferably the axis extends in a direction collinearly with the general (e.g. average) direction of fluid flow through the valve aperture.

Preferably the axis of the device is parallel to, e.g. collinear with, the axis of the conduit in which the device is arranged. It will be appreciated that this arrangement allows the device to be easily fitted within an existing pipe. Therefore no additional space may be required to house the device and it can be retro-fitted rapidly and at low cost in most sections of pipework or at most pipe joints without any significant alteration in the pipework. Devices in accordance the present invention can therefore significantly reduce the cost and work required to incorporate it into an existing system.

The housing may be provided to define the valve aperture in any suitable and desired way. In a preferred embodiment the housing comprises a wall in which the valve aperture is defined. Preferably the (e.g. wall of the) housing is attached to (and preferably sealed against) the mounting member. Connecting the housing (and thus the valve aperture), e.g. structurally and directly, to the mounting member helps to align the valve member precisely with the valve aperture.

The valve aperture may be arranged with respect to the mounting member and the valve member, and to the conduit, in any suitable and desired configuration. Preferably, as indicated above, the valve aperture lies in a plane perpendicular to the axis of the mounting member and, thus preferably also to the axis of the device. Preferably the valve aperture is circular.

Preferably the housing comprises an interior volume that substantially surrounds the mounting member and the valve member, e.g. the mounting member and the valve member are arranged in the interior volume of the housing.

The valve member is movably mounted on the mounting member such that it is able to move reciprocally on the mounting member, and thus with respect to the valve aperture. Preferably the mounting member is cylindrical. Preferably the valve member moves in a direction parallel to the axis of the (e.g. cylindrical) mounting member and, e.g. to the axis of the device and/or to the conduit, e.g. coaxial about the mounting member. Thus preferably the valve member is arranged to move in a direction perpendicular to the plane of the valve aperture. Preferably the valve member moves axially towards and away from (i.e. reciprocally) the valve member.

It will be appreciated that in at least preferred embodiments the fluid flow is axial through the valve aperture but, owing to the valve member downstream of the valve aperture and/or the convex curved surface of the housing, the fluid flow is turned away from the central axis of the device. Thus preferably the geometry of the device is such that the flow is turned towards the surface of the housing that the seal is on (though the convex curved surface is such that the flow separates from the surface of the housing and away from soft seal). Owing to this turning of the fluid flow, this has the effect that any higher density solids in the fluid flow (which have higher momentum than the rest of the fluid flow) are not turned with the fluid flow towards the soft seal and so do not abrade the soft seal.

The valve member may be any suitable and desired cross sectional shape (in a directional perpendicular to its axis), for moving in a reciprocal manner on the (e.g. outside of the) (e.g. cylindrical) mounting member. Preferably the inner surface of the valve member has the same cross sectional shape as the outer surface of the mounting member, e.g. circular. Such an arrangement facilitates the reciprocal motion of the valve member.

Preferably the part of the valve member, e.g. the end of the valve member closest to the valve aperture, that engages with the valve aperture, has a shape that is complementary to the shape of the valve aperture. Preferably the (e.g. end of the) valve member has the same cross sectional shape as the shape of the valve aperture, e.g. circular.

The mounting member is provided on the downstream side of the valve aperture. Thus preferably the valve member is on the downstream side of the valve aperture. Preferably the valve member is arranged to come into contact with, and seal on, the downstream side of the housing to close the valve aperture.

Preferably the valve member is mounted on the outside of the mounting member. Preferably the valve member and the mounting member define between them a control volume. Thus preferably the fluid flow control device comprises a control volume defined between the cylindrical mounting member and the valve member. Preferably the control volume contains a control pressure arranged to bias the valve member towards the valve aperture. Preferably the device comprises an arrangement for introducing a control pressure into the control volume.

Thus preferably when the upstream pressure is low (e.g. lower than the control pressure), the valve member moves towards the housing to close the valve aperture, and when the upstream pressure is high (e.g. higher than the control pressure), the valve member moves away from the housing to open the valve aperture. Thus preferably the valve member is acted on by the pressure of the upstream side and the control pressure so as to be moved by the difference between these pressures.

The soft seal, arranged on the housing (for substantially sealing the valve aperture when the valve member contacts the housing), may be any suitable and desired type of seal. Thus the soft seal may be made from any suitable and desired material. In one embodiment the soft seal comprises an elastomer, e.g. nitrile, soft seal. In one embodiment the soft seal comprises polytetrafluoroethylene (PTFE), polyurethane, ethylene propylene diene monomer (EPDM) rubber or FKM (aka Viton). Such materials may help to allow the valve member to form an effective seal between the valve member and the housing, thus helping to seal the valve aperture at shut-off.

The seal may comprise any suitable and desired configuration. In one embodiment the seal comprises an O-ring. In another embodiment the seal comprises a U-ring.

The housing comprises a convex curved surface and the soft seal is positioned on the housing downstream of this convex curved surface. Preferably the soft seal is arranged, e.g. the housing is shaped and/or the seal is positioned, such that the valve member contacts the soft seal directly. This helps to provide an effective seal, e.g. at shut-off, between the valve member and the housing.

In one set of embodiments the soft seal is arranged, e.g. the housing is shaped and/or the soft seal is positioned, such that the valve member comes into contact with the soft seal before the valve member contacts the housing (i.e. when the valve member is moving towards the housing to close the valve aperture). However, in another set of embodiments, which will be discussed below, the device may comprise a component that is required to be moved out of the way (e.g. by the valve member) before the valve member can contact the soft seal. Even when a component is required to be moved out of the way, preferably the valve member contacts the soft seal directly (i.e. after the component has been moved out of the way).

Preferably the soft seal is provided on a surface of the housing, i.e. a surface of the housing downstream of the convex curved surface of the housing. Preferably the soft seal is located downstream of the valve aperture, e.g. downstream of the location at which the valve aperture has a minimum cross section. Preferably the soft seal is positioned on a downstream facing surface of the housing, e.g. facing away from the flow of fluid that is incident upon the valve aperture and, e.g., facing towards the valve member.

Thus preferably (e.g. an end cap of) the valve member is arranged to seal (when the valve member closes the valve aperture) against the downstream (facing) surface of the housing that defines the valve aperture.

Preferably the surface of the housing on which the soft seal is located is a (e.g. continuous) downstream extension of the convex curved surface of the housing. Preferably the (e.g. downstream extended) surface of the housing on which the soft seal is located also comprises a convex curved surface (e.g. either side of the groove), e.g. preferably to match the convex curved surface of the housing. As will be discussed below, preferably the convex curved surface upstream of the soft seal has a smaller radius of curvature than the radius of curvature of the convex curved surface on which the soft seal is located.

Preferably the housing comprises a groove, downstream of the convex curved surface, in which the soft seal is located. The groove helps to retain the soft seal in place and helps to passively shield the soft seal from the flow of fluid (e.g. the part of the seal which does not come into direct contact with the valve member).

Preferably the soft seal extends (e.g. substantially) all the way around the valve aperture. Preferably the soft seal comprises an (e.g. continuous) annular soft seal. Thus, when the soft seal is located in a groove, preferably the groove comprises an annular groove, e.g. that extends (e.g. substantially) all the way around the valve aperture.

Preferably the soft seal projects from the surface of the housing. This helps the valve member to come into contact with the soft seal and form an effective seal. Thus, when the soft seal is located in a groove, preferably the depth (e.g. cross sectional diameter) of the soft seal is greater than the depth of the groove. When the device comprises a component that is required to be moved out of the way for the valve member to be able to contact the soft seal, preferably the soft seal projects from the surface of the housing relative to the position of the component once it has been moved out of the way.

The valve member may be any suitable and desired shape to engage with the soft seal to close the valve aperture. The valve member may engage with the housing defining the valve aperture, i.e. it may seal the valve aperture by contacting the soft seal, in any suitable and desired way. In a preferred embodiment the valve member comprises an end cap that is arranged to open and close the valve aperture, e.g. seal against the housing defining the valve aperture when closed. Preferably the (e.g. end cap of the) valve member comprises a conical surface that is arranged to contact the soft seal (and, e.g., the surrounding surface of the housing). Other parts of the (e.g. end cap of the) valve member may be curved, conical and/or flat.

The convex curved surface may be shaped to separate the flow of fluid through the valve aperture away from the convex curved surface, such that the fluid flow does not impinge directly on the soft seal, in any suitable and desired way. Thus preferably the soft seal is located downstream of the convex curved surface out of the flow path of the fluid through the valve aperture, i.e. when the valve member is positioned such that the valve aperture is at least partly open (such that there is a flow of fluid through the valve aperture and thus separation of the fluid flow away from the convex curved surface can occur). The soft seal being out of the flow path of the fluid flow through the valve aperture helps to shield the soft seal from the fluid flow. Preferably the downstream projection of the (e.g. cross section of the) flow path through the valve aperture from the convex curved surface does not intercept (i.e. it cannot "see") the soft seal.

Preferably the soft seal is positioned downstream of a high curvature surface, which has the effect of separating the fluid flow from the surface and thus away from the soft seal. Preferably the soft seal is located downstream of the point on the convex curved surface at which the fluid flow separates from the convex curved surface. Preferably the convex curved surface upstream of the soft seal has a smaller radius of curvature than the radius of curvature of the (e.g. convex curved) surface on which the soft seal is located.

Preferably the convex curved surface of the housing, upstream of the soft seal, is continuously curved, e.g. a substantially smooth curve, such that preferably there are no discontinuities in the shape (and, e.g., the surface gradient) of the convex curved surface.

It will be appreciated that in order to form the valve aperture the housing will be concave around the edge of the valve aperture, e.g. in the plane of the valve aperture. Therefore, preferably the housing comprises the convex curved surface in a plane perpendicular to the plane of the valve aperture, e.g. in a plane (or planes) that include (or are parallel to) the axis of the device (e.g. the axis through the centre of the valve aperture and/or parallel to the direction in which the valve aperture moves), e.g. preferably the cross section of the housing in a plane perpendicular to the plane of the valve aperture comprises a convex curved shape. Thus preferably the curved surface of the housing is convex in this plane.

The convex curved surface of the housing may extend (e.g. upstream of the soft seal) by any suitable and desired amount. In a preferred embodiment the convex curved surface of the housing extends through an angle of at least 45 degree, e.g. at least 90 degrees, e.g. at least 120 degrees, e.g. approximately 135 degrees.

The convex curved surface may extend from any suitable and desired position on the housing. Preferably the convex curved surface extends downstream at least from the point on the housing at which the valve aperture has a minimum cross section (e.g. the convex curved surface may extend upstream from this point). The convex curved surface may extend through the valve aperture, e.g. through the point on the housing at which the valve aperture has a minimum cross section. Thus the convex curved surface may extend downstream from a front face of the housing, e.g. through the valve aperture, e.g. to a point on the housing downstream of the valve aperture, e.g. to a point on the housing downstream of the point on the housing at which the valve aperture has a minimum cross section.

Preferably the convex curve surface is located (and, e.g. extends) upstream of the point on the housing at which the valve member contacts the housing. This point may be at or, e.g. upstream of, the soft seal.

In a preferred embodiment the housing comprises a deflector upstream of the soft seal (e.g. on or downstream of the convex curved surface) arranged to deflect the flow of fluid through the valve aperture away from the soft seal. This helps to prevent the direct flow of fluid onto the soft seal, e.g. by actively separating the fluid flow from the surface of the housing on which the seal is provided and/or shielding the soft seal from the fluid flow. This is considered to be novel and inventive in its own right. Therefore when viewed from a further aspect the invention provides a device for controlling the flow of a fluid through a conduit from an upstream side of the device to a downstream side of the device, the device comprising:
- a housing defining a valve aperture;
- a mounting member arranged on the downstream side of the valve aperture;
- a valve member movably mounted on the mounting member, wherein the valve member is arranged to move reciprocally to selectively open and close the valve aperture, thereby controlling flow of the fluid through the valve aperture; and
- a soft seal arranged on the housing for substantially sealing the valve aperture when the valve member contacts the housing, wherein the housing comprises a deflector positioned upstream of the soft seal, and wherein the deflector is arranged to deflect the flow of fluid through the valve aperture away from the soft seal such that the fluid does not impinge directly on the soft seal.

The deflector may be any suitable and desired feature on the housing to deflect the flow of fluid away from the soft seal. In one embodiment the deflector comprises a projection from (e.g. a lip on) the surface of the housing. The deflector may be provided adjacent (e.g. directly upstream of) the soft seal. Thus the deflector may comprise a lip of a groove in which the soft seal is located.

The deflector may be a fixed (e.g. immovable) feature on the housing. The deflector may be positioned such the valve member is able to make (e.g. direct) contact with the soft seal. Thus, for example, the deflector may be positioned such that the deflector does not impede (e.g. it is clear of) the movement of the valve member when the valve member comes into contact with the housing. Thus the deflector may be positioned such that the valve member does not contact the deflector when the valve member contacts the soft seal.

The deflector may be arranged to not impede the movement of the valve member in any suitable and desired way, e.g. owing to the shape of the deflector, the shape of the surface of the housing on which the deflector is positioned and/or the shape of the (e.g. convex) valve member (e.g. at and around the point at which the valve member contacts the soft seal and/or the housing). In one embodiment the housing comprises a movable deflector, wherein the valve member is arranged to move the deflector when the valve member contacts the housing. Preferably the valve member is arranged to move the deflector axially (e.g. in the same direction as the valve member moves, e.g. along the main axis of the device).

In one embodiment the deflector comprises an independent component (e.g. structurally separate from, but e.g. mounted on, the housing) that is movable by the valve member. In another embodiment the deflector comprises (e.g. an integral) part of the housing that is movable by the valve member. Thus a whole part of the housing, e.g. the part of the housing from the deflector upstream, may be moved by the valve member, e.g. such that the valve member is able to seal against the soft seal.

When the deflector is movable, preferably the deflector is resiliently biased (e.g. sprung) towards the valve member. The deflector may be resiliently biased in any suitable and desired way. In one embodiment the device comprises a sprung member, e.g. a spring or a deformable member (e.g. an elastomeric piece of material) that is arranged (e.g. between the housing and the deflector) to bias the deflector towards the valve member. When the deflector comprises part of the housing, the deflector may be connected to the rest of the housing (e.g. the part on which the soft seal is located) by the sprung member, e.g. by a spring loaded connector (e.g. bolt).

While the above description has detailed the soft seal as being on the housing and being contacted by the valve member, it will be appreciated that the opposite configuration may also be used. Thus when viewed from a further aspect the invention provides a device for controlling the flow of a fluid through a conduit from an upstream side of the device to a downstream side of the device, the device comprising:
- a housing defining a valve aperture;
- a mounting member arranged on the downstream side of the valve aperture;
- a valve member movably mounted on the mounting member, wherein the valve member is arranged to move reciprocally to selectively open and close the valve aperture, thereby controlling flow of the fluid through the valve aperture; and
- a soft seal located on a convex curved surface of the valve member, wherein the soft seal is arranged to substantially seal the valve aperture when the valve member contacts the housing, wherein the valve member comprises a deflector positioned on the convex curved surface of the valve member upstream of the soft seal, and wherein the deflector is arranged to deflect the flow of fluid through the valve aperture away from the soft seal such that the fluid does not impinge directly on the soft seal.

It will be appreciated by those skilled in the art that all of the described aspects and embodiments of the present invention can, and preferably do, include, as appropriate, any one or more or all of the preferred and optional features described herein. For example, the soft seal may be located in a groove, e.g. in the convex curved surface. Preferably at least part of the convex curved surface is located upstream of the soft seal and preferably the convex curved surface is shaped to separate the flow of fluid through the valve aperture away from the convex curved surface of the valve member such that the fluid does not impinge directly on the seal.

Certain preferred embodiments of the invention will now be described, by way of example only, with reference to the accompanying drawings in which:

FIGS. 1-5 show cross sectional views of devices in accordance with embodiments of the invention.

There are many different industrial situations in which there is a desire to regulate the pressure in a fluid flow stream through a pipe or conduit. In such systems there is an input pressure that may be constant or fluctuating in time and which it is desired to control to a lower target output pressure, which also can be constant or fluctuating. As will now be described, embodiments of the present invention provide devices that are able to provide this control for the fluid flow.

FIG. 1 shows a cross sectional view of a fluid flow control device 1 in accordance with an embodiment of the present invention. The device 1 is mounted in a conduit 2 at a flange 4 between the upstream and downstream sides 6, 8 of the conduit 2, where it is clamped in place by means of a flange bolt circle 10. In FIG. 1 the fluid flow is from left to right from the upstream side 6 of the conduit 2, through the device 1 and into a downstream side 8 of the conduit 2.

The device 1 comprises three main components: a cylindrical mounting member 12, a valve member 14 and a housing 16 that defines a valve aperture 18. Each of these components is machined from a piece of stainless steel. The cylindrical mounting member 12 projects perpendicularly from a flange 20 that is used to mount the device 1 in the conduit 2. The housing 16 is attached to and sealed against the flange 20. The housing 16 and the flange 20 are machined and attached to each other so that the valve member 14 is aligned with the valve aperture 18. Apertures 22 in the flange 20 allow a flow path for fluid from the inside of the housing 16 and into the downstream side 8 of the conduit 2.

The valve member 14, which has a cylindrical sheath portion 24 and a rounded end cap 26 (i.e. having a conical surface), is mounted on the outside of the cylindrical mounting member 12 such that it is able to move reciprocally along the outer surface of the cylindrical mounting member 12. The valve member 14 can thus move between a position in which the rounded outer face of the end cap 26 is sealed against the inner face of the housing 16 to fully close the valve aperture 18, and a position in which the inner face of the end cap 26 abuts the end of the cylindrical mounting member 12 (though the spring force exerted by the spring 28 may be arranged to prevent this).

The cylindrical mounting member 12 has a hollow central bore 30 in which a helical spring 28 is located. Between them, the valve member 14 (i.e. its cylindrical sheath portion 24 and end cap 26) and the cylindrical mounting member 12 (with its hollow central bore 30) define a control volume 32, which is sealed an annular seal 34.

At the point at which the rounded end cap 26 of the valve member 14 contacts the inner face of the housing 16, an annular nitrile (or, e.g., polytetrafluoroethylene (PTFE), polyurethane, ethylene propylene diene monomer (EPDM) rubber or FKM (aka Viton), depending on the fluid the pressure actuated regulator is to be used with) soft seal 36 is located in a groove 38 on the inner face of the housing 16. The soft seal 36 projects beyond the surface of the inner face of the housing 16. The housing 16 upstream of the annular soft seal 36 is rounded and comprises a convex curved surface from the front face of the housing 16 through the valve aperture 18. When the valve member 14 contacts the inner face of the housing 16, it therefore contacts the soft seal 36 first.

Ducts 40 are provided through the housing 16 and the flange 20 to provide fluid communication with a pilot regulator (not shown) to set a control pressure in the control volume 32.

Operation of the fluid flow control device 1 shown in FIG. 1 will now be described. First, the control pressure in the control volume 32 is set, e.g. using the pilot pressure regulator (not shown). The control pressure determines how the valve member 14 will react to changes in the fluid flow through the device, e.g. owing to changes in the upstream and/or downstream pressures in the upstream and downstream sides 6, 8 of the conduit 2. When these pressures change such that the valve member 14 is biased by the control pressure to move towards the housing 16 to close the valve aperture 18 (e.g. owing to a rise in the upstream pressure), the valve member 14 moves towards the housing 16, e.g. to attempt to maintain a target downstream pressure.

If the pressure conditions are sufficient, the valve member 14 may close and contact the soft seal 36 to seal the valve aperture 18. In other pressure conditions the valve member 14 may remain open, thus leaving a flow path for the flow of fluid through the valve aperture 18.

When fluid is flowing through the valve aperture 18, the flow from the upstream side 6 of the conduit 2 is axial, initially. As the fluid flow is incident upon the end cap 26 of the valve member 14, the fluid flow is turned and forced to have a radial component as the fluid flows between the valve member 14 and the inner face of the housing 16, i.e. past the soft seal 36.

However, owing to the high curvature of the convex curved surface of the housing 16 upstream of the soft seal 36, as fluid flows through the valve aperture 18, fluid that was previously in contact with the convex curved surface of the housing 16 separates away from the convex curved surface and therefore does not impinge directly upon the soft seal 36. This protects the soft seal 36 from wear, particularly against abrasion from solid material that may be entrained in the fluid flow.

Figure 2:
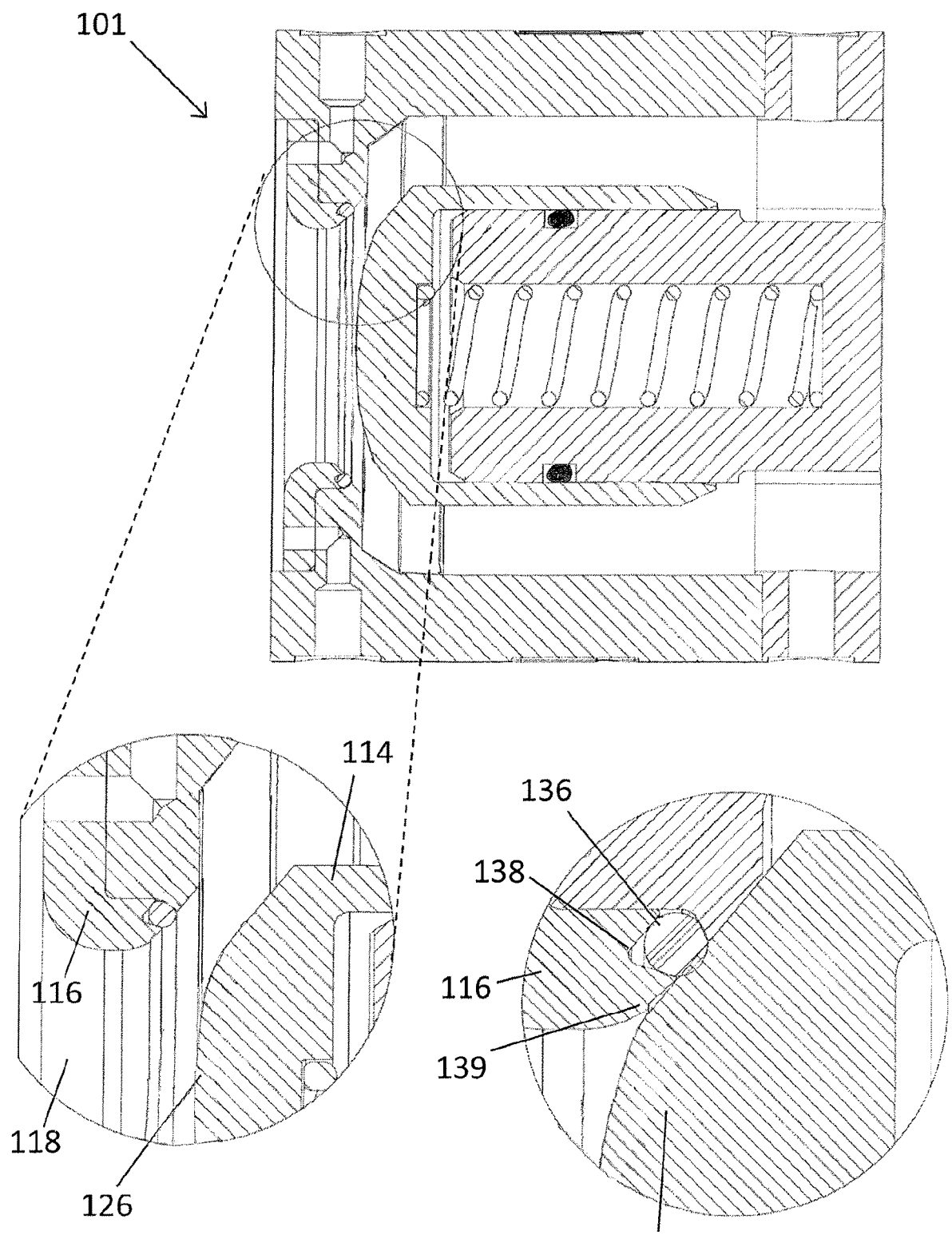

FIG. 2 shows a device 101 in accordance with a further embodiment of the present invention, which is a variant of the device 1 shown in FIG. 1.

The device 101 shown in FIG. 2 is very similar to the device 1 shown in FIG. 1, except for the detail shown in the magnified sections in FIG. 2. This shows that the housing 116, downstream of the convex curved surface of the housing 16 through the valve aperture 118 and upstream of the annular soft seal 136 in the groove 138 in the housing 116, comprises a small projection 139 arranged to deflect the fluid flow through the valve aperture 118.

From the further magnified section in FIG. 2, it can be seen that the projection 139 is such that when the end cap 126 of the valve member 114 comes into contact with the housing 116 (when the end cap 126 seals against the annular soft seal 136, thus closing the valve aperture 118), owing to the convex curved surface of the housing 116 and the curved end cap 126, the projection 139 does not impede the end cap 126 of the valve member 114.

Figure 3:
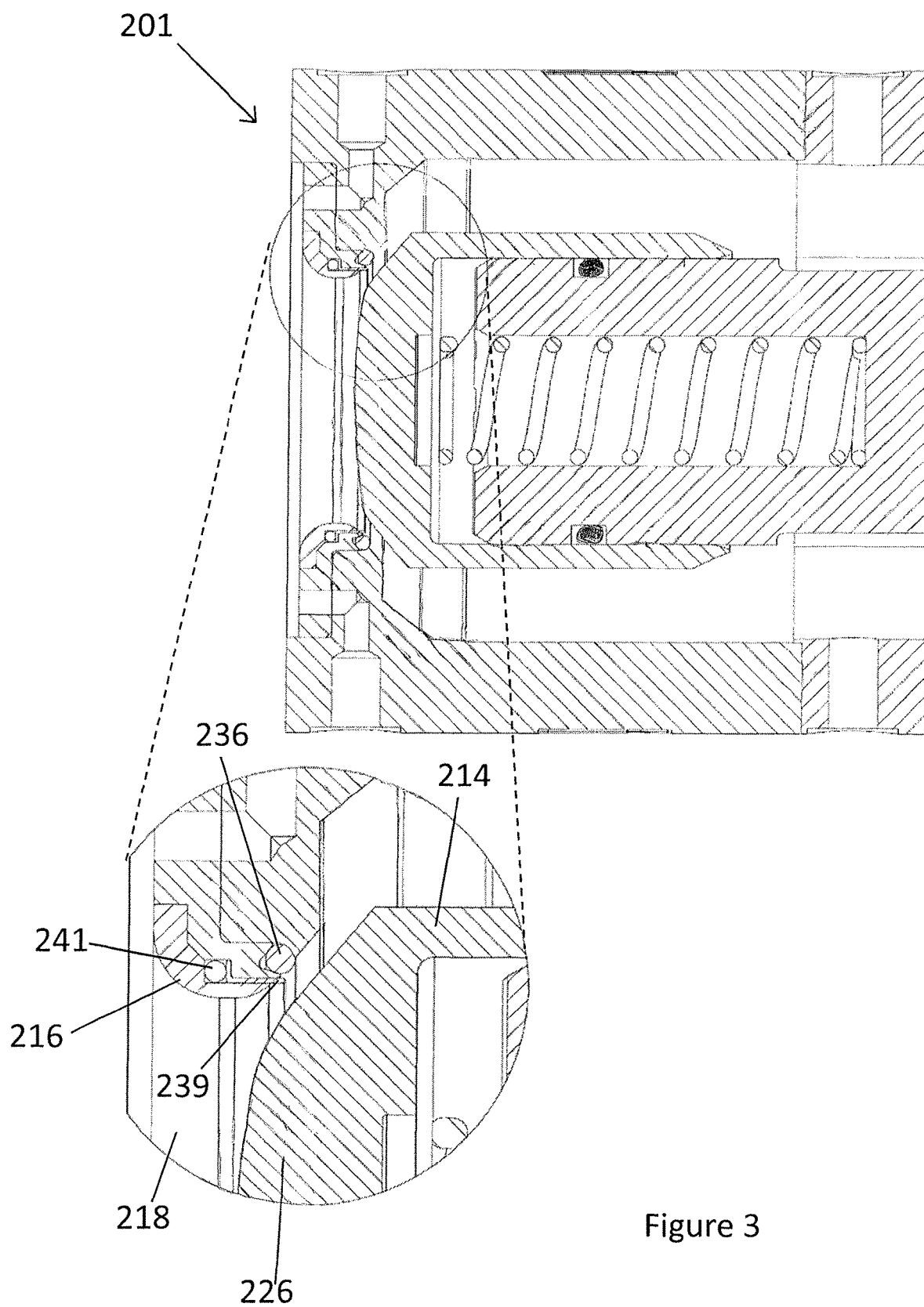

FIG. 3 shows a device 201 in accordance with a further embodiment of the present invention, which is a variant of the devices 1, 101 shown in FIGS. 1 and 2.

The device 201 shown in FIG. 3 is very similar to the device 101 shown in FIG. 2, except for the detail shown in the magnified section in FIG. 3. This shows that the housing 216 again comprises a small projection 239 arranged to deflect the fluid flow through the valve aperture 218. However, in contrast to the fixed projection shown in FIG. 2, the projection 239 is movable and biased by a piece of elastomeric material 241 towards the valve member 214.

Thus, when the valve member 214 comes into contact with the housing 216, the valve member 214 moves the movable projection 239 axially against the bias of the piece of elastomeric material 241 such that the end cap 226 of the valve member 214 is able to seal against the annular soft seal 236, thus closing the valve aperture 218. Thus the movable projection 239 both acts to deflect the flow of fluid through the valve aperture 218 away from the annular soft seal 236 but allows the end cap 226 of the valve member 214 to come into contact with the annular soft seal 236.

Figure 4:
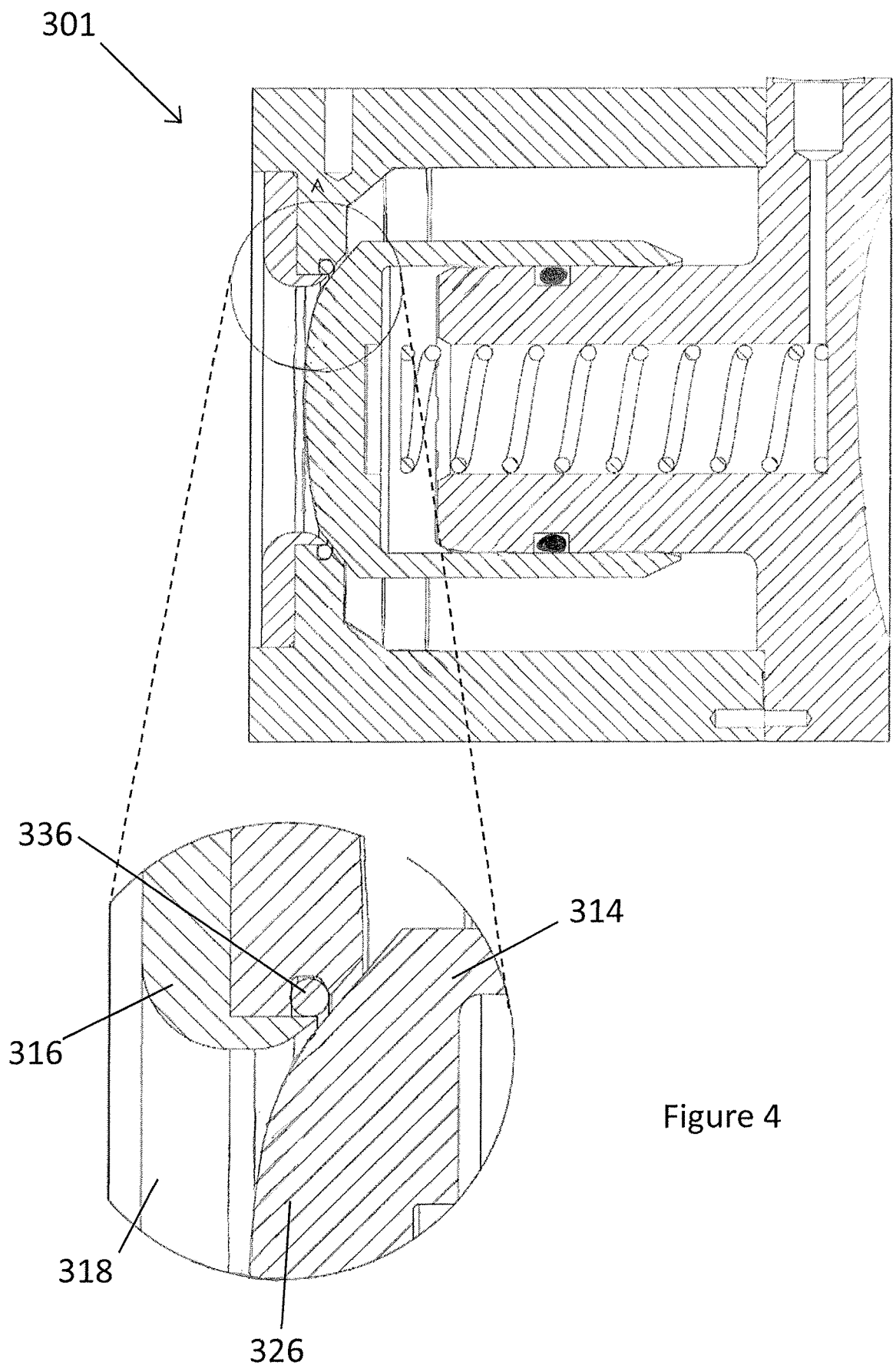

FIG. 4 shows a device 301 in accordance with a further embodiment of the present invention, which is a variant of the devices 1, 101, 201 shown in FIGS. 1-3.

The device 301 shown in FIG. 4 is very similar to the device 1 shown in FIG. 1, except for the detail shown in the magnified section in FIG. 4. This shows that the part of the housing 316 that has the convex curved surface through the valve aperture 318 is attached to the rest of the housing 316 by a spring loaded bolt that biases the convex curved surface part of the housing 316 towards the valve member 314. When the valve aperture 318 is open, the convex curved surface part of the housing 316 thus deflects the fluid flow away from the annular soft seal 336.

Thus, when the valve member 314 comes into contact with the housing 316, the valve member 314 moves the housing 316 axially against the bias of the spring loaded bolt such that the end cap 326 of the valve member 314 is able to seal against the annular soft seal 336, thus closing the valve aperture 318. Thus the movable part of the housing 316 both acts to deflect the flow of fluid through the valve aperture 318 away from the annular soft seal 336 but allows the end cap 326 of the valve member 314 to come into contact with the annular soft seal 336.

Figure 5:
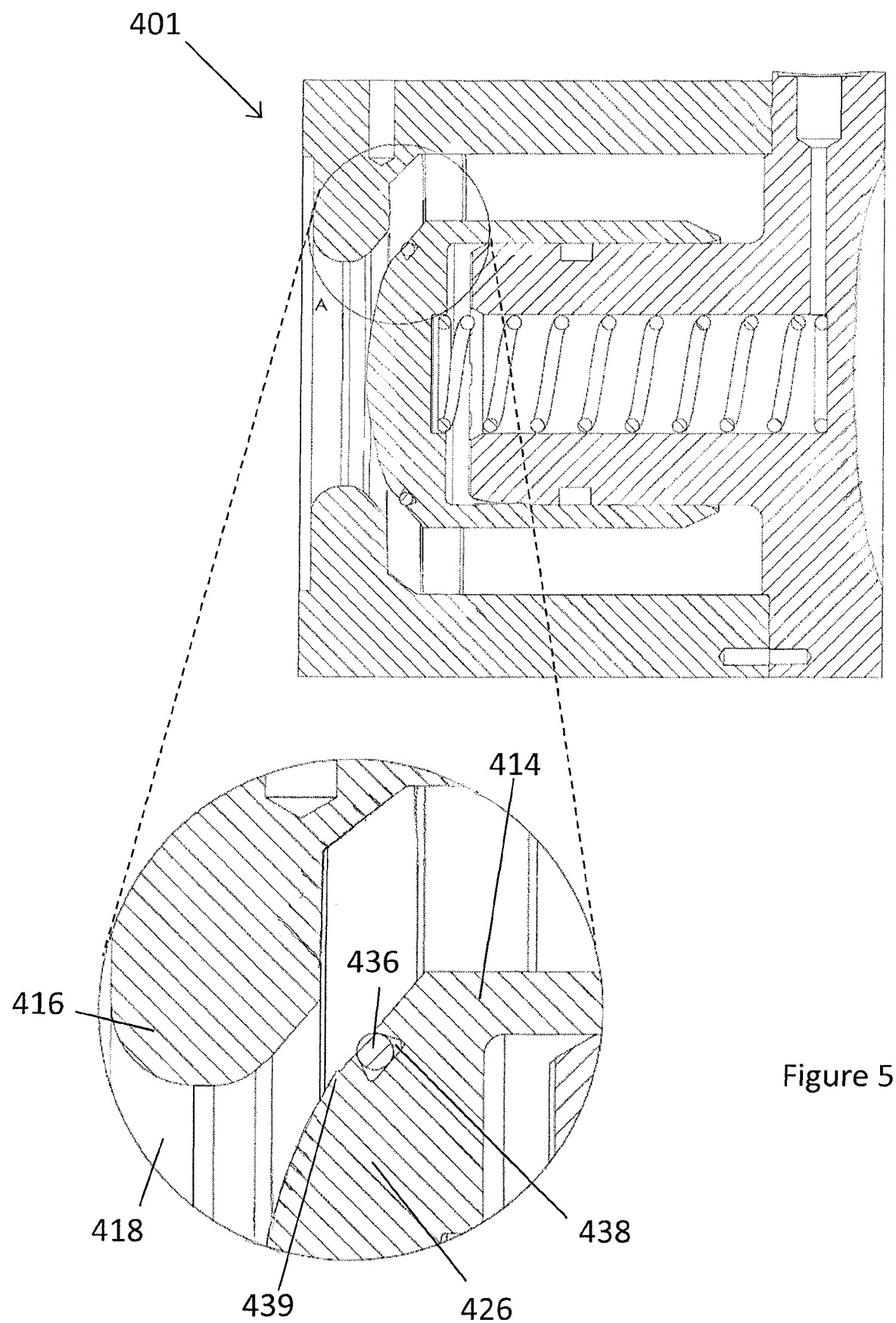

FIG. 5 shows a device 401 in accordance with a further embodiment of the present invention, which is a variant of the device 1 shown in FIG. 1.

The device 401 shown in FIG. 5 is very similar to the device 101 shown in FIG. 2, except for the detail shown in the magnified section in FIG. 5. This shows that instead of the annular soft seal being provided on the inner face of the housing, an annular soft seal 436 is provided in a groove 438 on the end cap 426 of the valve member 414, downstream of a small projection 439 on the end cap 426 arranged to deflect the fluid flow through the valve aperture 418 and away from the annular soft seal 436.

Owing to the convex curved surface of the housing 416 and the curved end cap 426, the projection 439 does not impede the end cap 426 of the valve member 414 coming into contact with the soft seal 436, thus allowing the soft seal 436 to seal against the inner face of the housing 416, sealing the valve aperture 418 closed.

It can be seen from the above that in at least preferred embodiments of the invention, the device includes a soft seal for sealing the valve aperture of the device which is provided out of the direct flow path of the fluid flow through the valve aperture, owing to the separation of the fluid flow from the convex curved surface of the housing that defines the valve aperture. This helps to reduce wear of the soft seal by the fluid flow, particularly when the fluid flow contains abrasive particles entrained in the fluid. Reducing wear of the soft seal (which may be prone to erosion) helps to improve the reliability and durability of the fluid flow control device.

The invention claimed is:

1. A device for controlling the flow of a fluid through a conduit from an upstream side of the device to a downstream side of the device, the device comprising:
   a housing defining a valve aperture;
   a mounting member arranged on the downstream side of the valve aperture, wherein the mounting member is cylindrical;
   a valve member movably mounted on an outer surface of the cylindrical mounting member, wherein the valve member is arranged to move reciprocally to selectively open and close the valve aperture, thereby controlling flow of the fluid through the valve aperture;
   a control volume and a control pressure duct, wherein:
      the control volume is defined between the cylindrical mounting member and the valve member;
      the control pressure duct extends through the housing of the device; and
      the control pressure duct is arranged for introducing a control pressure into the control volume to bias the valve member towards the valve aperture;
   a soft seal arranged on the housing for substantially sealing the valve aperture when the valve member contacts the housing, wherein:
      the soft seal is located downstream of a convex curved surface of the housing,
      the convex curved surface is shaped to separate the flow of fluid through the valve aperture away from the surface of the housing such that the fluid does not impinge directly on the soft seal; and
   the housing comprises a deflector upstream of the soft seal, wherein:
      the deflector is integral with the housing and distinct from the convex curved surface of the housing; and
      the deflector is positioned and shaped to deflect the flow of fluid through the valve aperture away from the soft seal;
   wherein the device further comprises:
      a further seal, arranged between an inner surface of the valve member and the outer surface of the cylindrical mounting member, wherein the further seal is arranged for substantially sealing the control volume and the control pressure duct from the fluid flowing through the valve aperture.

2. The device as claimed in claim 1, wherein the valve member is arranged to come into contact with the downstream side of the housing to close the valve aperture.

3. The device as claimed in claim 1, wherein the soft seal is located on a surface of the housing which is a downstream extension of the convex curved surface of the housing.

4. The device as claimed in claim 1, wherein the convex curved surface is continuously curved.

5. The device as claimed in claim 1, wherein the deflector comprises a movable deflector, wherein the valve member is arranged to move the movable deflector when the valve member contacts the housing.

6. The device as claimed in claim 5, wherein the valve member is arranged to move the movable deflector axially.

7. The device as claimed in claim 5, wherein the movable deflector comprises a part of the housing that is movable by the valve member.

8. The device as claimed in claim 5, wherein the movable deflector is resiliently biased towards the valve member.

9. The device as claimed in claim 1, wherein an upstream surface of the valve member has a greater diameter than a diameter of the soft seal.

10. The device as claimed in claim 1, wherein the valve member comprises a cylindrical sheath portion and an end cap, wherein the cylindrical sheath portion is movably mounted on the outer surface of the cylindrical mounting member, and wherein the end cap is arranged upstream of the cylindrical mounting member.

11. A device for controlling the flow of a fluid through a conduit from an upstream side of the device to a downstream side of the device, the device comprising:
   a housing defining a valve aperture;
   a cylindrical mounting member arranged on the downstream side of the valve aperture;
   a valve member movably mounted on an outer surface of the cylindrical mounting member, wherein the valve member is arranged to move reciprocally to selectively open and close the valve aperture, thereby controlling flow of the fluid through the valve aperture;
   a control volume and a control pressure duct, wherein:
      the control volume is defined between the cylindrical mounting member and the valve member;
      the control pressure duct extends through the housing of the device; and
      the control pressure duct is arranged for introducing a control pressure into the control volume to bias the valve member towards the valve aperture;
   a soft seal arranged on the housing for substantially sealing the valve aperture when the valve member contacts the housing, wherein:

the housing comprises a deflector positioned upstream of the soft seal, the deflector comprises a movable deflector, wherein the valve member is arranged to move the movable deflector into a recess defined in the housing when the valve member contacts the housing, and the deflector is arranged to deflect the flow of fluid through the valve aperture away from the soft seal such that the fluid does not impinge directly on the soft seal; and wherein the device further comprises:

a further seal, arranged between an inner surface of the valve member and the outer surface of the cylindrical mounting member, wherein the further seal is arranged for substantially sealing the control volume and the control pressure duct from the fluid flowing through the valve aperture.

12. The device as claimed in claim 11, wherein an upstream surface of the valve member has a greater diameter than a diameter of the soft seal.

13. The device as claimed in claim 11, wherein the valve member comprises a cylindrical sheath portion and an end cap, wherein the cylindrical sheath portion is movably mounted on the outer surface of the cylindrical mounting member, and wherein the end cap is arranged upstream of the cylindrical mounting member.

* * * * *